L. BUTLER.
Seed Separator.
No. 225.
2 Sheets—Sheet 1.
Patented June 3, 1837.
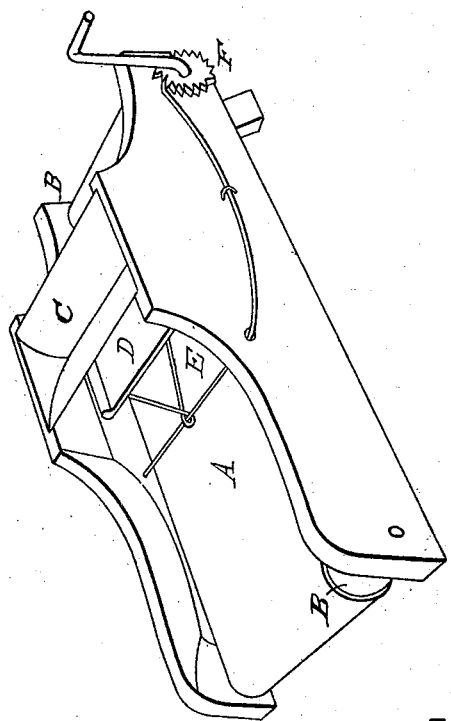
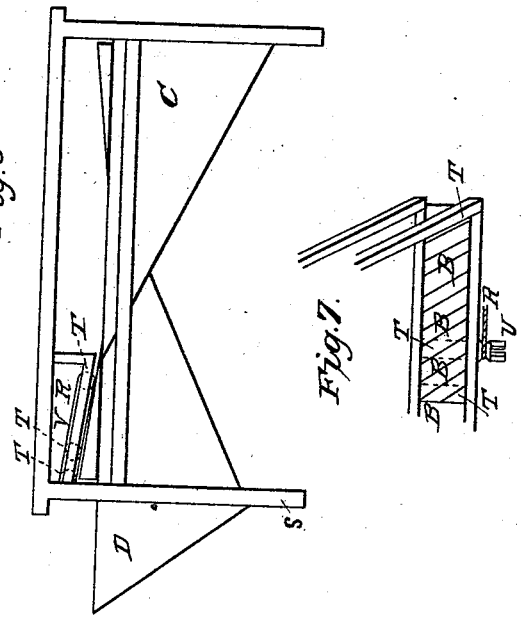

L. BUTLER.
Seed Separator.
No. 225.
2 Sheets—Sheet 2.
Patented June 3, 1837.
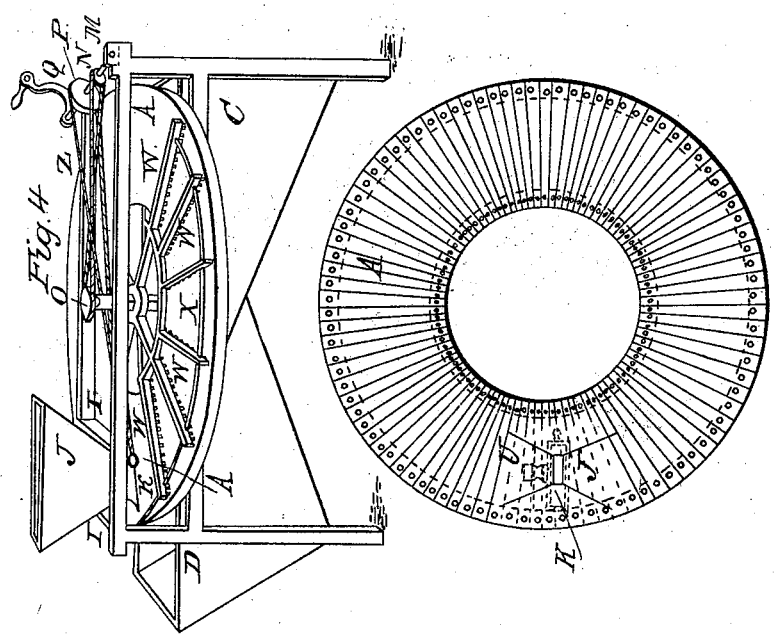
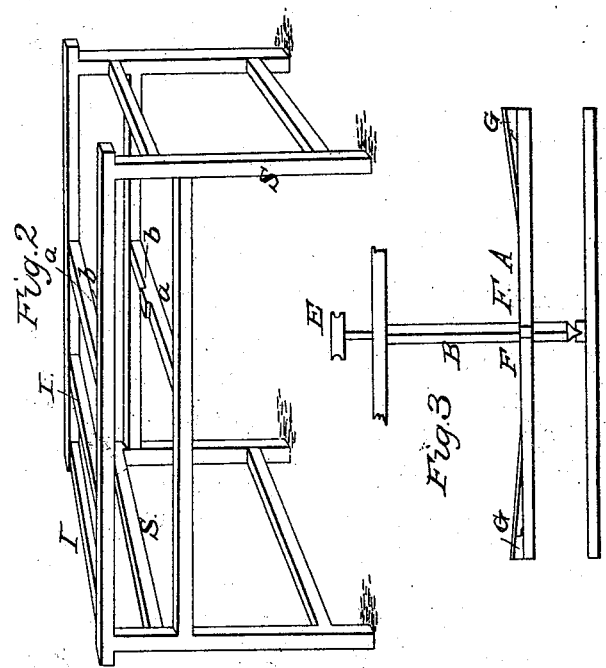
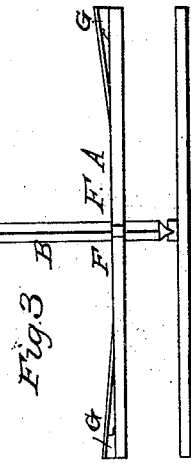

UNITED STATES PATENT OFFICE.

LESTER BUTLER, OF COBLESKILL, NEW YORK.

MACHINE FOR SEPARATING WILD PEAS OR OTHER ROUND SEEDS FROM GRAIN.

Specification of Letters Patent No. 225, dated June 3, 1837.

*To all whom it may concern:*

Be it known that I, LESTER BUTLER, of Cobleskill, in the county of Schoharie and State of New York, have invented a new and Improved Mode of Separating Wild Peas or other Round Seed from Grain; and I do hereby declare that the following is a full and exact description.

The nature of my invention consists of a horizontal wheel constructed with a sufficient inclination from the outer extremity or periphery to the center of the wheel so as to project all round seed over the inclined plane to the center where it is discharged or separated from the grain. By a single revolution of the horizontal inclined plane wheel the grain (after being cleansed from all round seed by the rotary motion of the wheel) is carried around until it nearly reaches the hopper where it is drawn off by a set of brushes moving from the inner to the outer periphery of said wheel.

In order that others may be enabled to make and use my invention I will proceed to describe its construction and operation.

In the first place I prepare a frame six feet in length—two and a half feet in width and four feet in height within the timbers or frame work which should be made of any suitable materials—size at least two by three inches. The one I have in operation and corresponding with the models has four posts—two at either end—one near the top and the other near the bottom of the posts. Also on either side two pieces one framed in near the center of the posts the other on the top of the same across the frame. At the center I place two pieces, one above and one below, of sufficient strength to support the wheel on the center of these insert boxes of any suitable material.

In order to form receivers for the grain and round seeds separately I place one end of the bottom for the right hand receiver on the lower timber at the right of the frame, elevating the other to the lower cross timber in which the box is inserted and extend it far enough past the center to receive whatever may be discharged through the eye of the wheel. The bottom for the left receiver I place on the lower timber at the left of the frame, one end fastened to the timber at the left of the frame, one end fastened to the timber in the center with the bottom of the right receiver which forms an inclination from the center to the ends of about one foot and four inches in addition to this I fit in boards at the sides and ends with slides for the purpose of drawing off the grain.

I prepare a shaft of, say six inches in diameter with a gudgeon in one end to run in the upper box in the other I place a point or pivot to run on the lower box. Through this shaft I frame or lock four or more arms of sufficient length to form a circle equal to the size of the wheel, suppose six feet. At the extremity of these arms place the fellies which form the outer periphery of the wheel. This rim I raise by means of blocks about four inches above the level of the arm at the shaft. About two feet and three inches toward the shaft I put a second set of fellies on a level with the arms which produces the required inclination or dip of the wheel, the surface of which whether of the naked boards, or covered with tin or sheet iron should have a smooth, hard surface. This wheel has a horizontal motion from left to right on the left are two pieces of timber of suitable dimensions forming a square to receive the hopper the outlet of which is placed in a shoe similar to those used for the like purpose in flouring mills. This shoe is suspended from the upper frame work by a wire. On the opposite end of the machine I place a shaft horizontally across the top, running in boxes of wood or metal. On the center of this shaft is a pulley of three inches in diameter around which a rope or strap passes to a pulley of one foot diameter on the upper end of the upright shaft also another pulley on this same shaft about seven inches to the right of the small one of about one foot diameter. On one end of this shaft is a crank at which place should the machine be propelled by water it would be proper to put a pulley to run by cord or strap. On the left end of the machine nearly under the hopper I place a frame for the brushes, composed of two pieces of timber which lead from the upper timber at the left end of the machine to the eye of the wheel where these should be framed in uprights, fastening them to one of the timbers forming the square sustaining the hopper. These timbers are placed about seven inches apart in which I place three rollers one at the outside one at the inside and the third about six inches from the greatest circumference of the wheel. This last roller has on the end nearest the hopper and shoe small irons which when in motion come in contact with the neck of the shoe and causes the grain to descend from the hopper on to the height of the inclined plane. Around these rollers I place a strap of leather on which I fasten strips of sheep's pelt which serves as a brush for the purpose of removing the grain from the wheel. I also place a number of leather rakes on the wheel for the purpose of displacing the grain on its course to the place where it is discharged, these are fastened by means of a wire passing from one to the other near the outer ends and hook it at the left hand corner. The other ends are kept in their place by means of a semicircle suspended from the upper timbers with stays on the under side.

References A represents the frame; B, the cross timbers with boxes inserted; C, the right receiver; D, the left receiver; E, the end of receiver with slide; F, the upright shaft with pulley on upper end: G, the arms with block on the ends; H, the inner circle of wheel; I, the cross timbers forming square for hopper; J, the hopper; K, the shoe; L, the horizontal shaft; M, the small pulley on horizontal shaft; N, the rope passing from small pulley on horizontal shaft to large pulley on upright shaft; O, the large pulley on horizontal shaft; P, the frame for brushes together with leather strap strips of pelt; Q, the roller with irons the end; S, small pulley on the roller; T, the rope passing from large pulley on horizontal shaft to small or on roller; U, the rakes.

What I claim as my invention and desire to secure by Letters Patent is—

The principle of separating round seeds from grain by a horizontal inclined plane wheel projected in such a manner as to admit during the revolution of the wheel or plane, a separation of round seeds from grain and the process of raking the deposits of the hopper and gathering the grain after being cleansed into a receiver attached to the machinery.

LESTER BUTLER.

Witnesses:
JEROME BROWN,
CHAS. WINTER.